J. V. STEVENS.

Churn.

No. 31,338.

Patented Feb. 5, 1861.

UNITED STATES PATENT OFFICE.

J. V. STEVENS, OF POMEROY, OHIO.

CHURN.

Specification of Letters Patent No. 31,338, dated February 5, 1861.

*To all whom it may concern:*

Be it known that I, J. V. STEVENS, of Pomeroy, in the county of Meigs and State of Ohio, have invented a new and useful Machine for Producing Butter from Cream, entitled "J. V. Stevens's Star Churn;" and I do hereby declare that the following is a full, clear, and exact description of the construction and operation of the same, reference being had to the annexed drawings, making a part of this specification.

Figure 1:
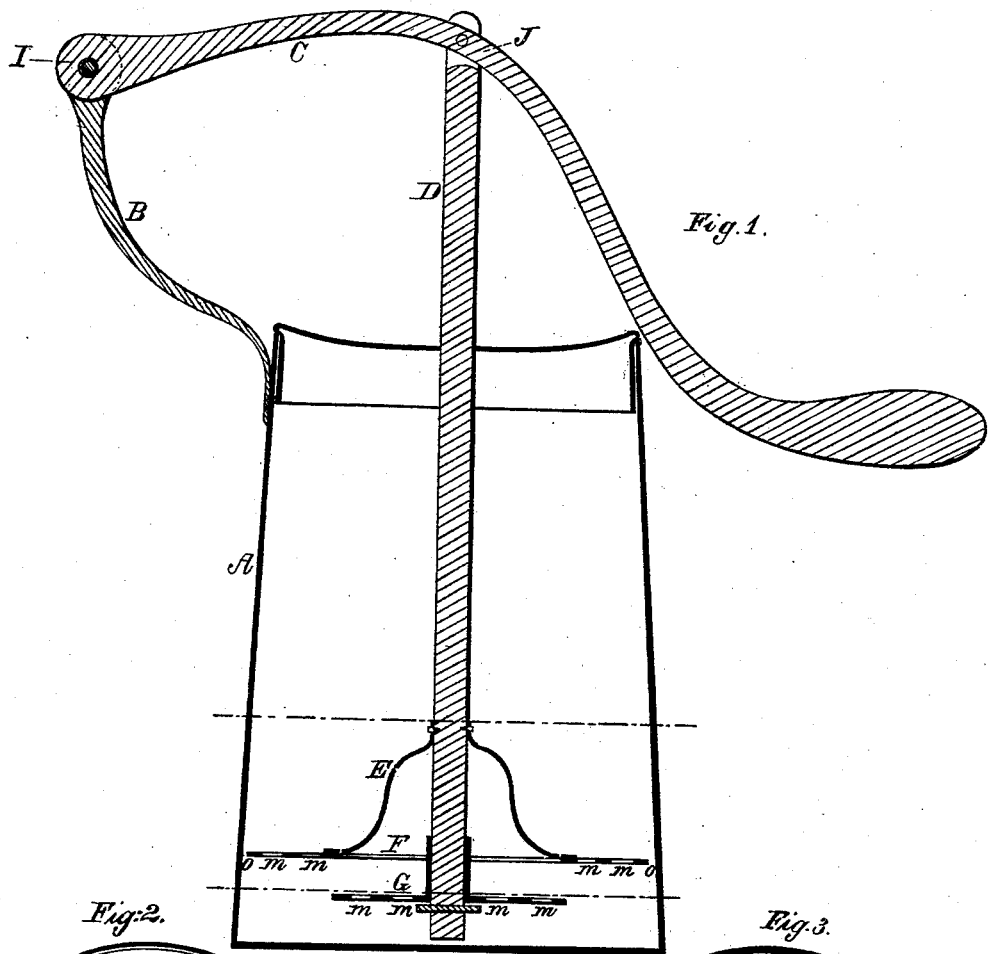
Figure 2:
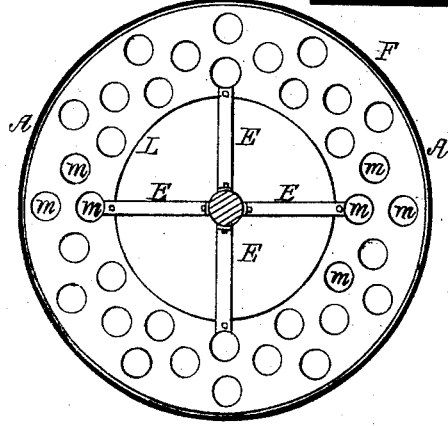

The nature of my invention consists in constructing a closely fitting dash (the body of the churn being made of a uniform size inside from top to bottom) perforated as at $m$, Figure 1, with an aperture through the center as at L, Fig. 2, sustained by bows, as at E, Fig. 1, provided with a valve as at G which closes the aperture L, Fig. 2, upon the downward pressure of the lever C, Fig. 1, which causes the cream to be forced up through the perforations $m$ in the dash and valve and upon the upward motion of the lever C the cream passes freely down through the aperture L and is again forced up through the perforations $m$, &c., which creates a violent agitation of the cream producing butter under favorable circumstances in one and a half minutes by the clock.

To enable others skilled in the art to make and use my invention I will proceed to describe its construction and operation.

I construct the body of my churn A A of a uniform size from top to bottom inside of any material commonly used for that purpose, stone ware however being preferable on account of its cheapness and freeness from taint. Where they are made of the last named material it will be necessary to have a recess left on top to receive a hoop to sustain the arm B. I construct my dash to fit the body of the churn closely, perforated as at $m\ m$, Fig. 1. The dash is supported by the bows E which pass through the stem of the dash D, Fig. 1, at right angles with an aperture as at L, Fig. 2, which is covered by a valve G, Fig. 3, the valve being opened and closed by the motion of the lever C, Fig. 1. This being sufficient in my opinion to enable others skilled in the art to make and use my invention I will proceed to name the parts in detail alphabetically.

A A, Fig. 1, represents the body of the churn.

B represents the arm which supports the end of the lever.

C represents the lever by means of which the dash is moved up and down.

D represents the stem of the dash.

E represents the bows that sustain the dash.

F represents the dash.

G represents the valve.

$h$ represents the pin that sustains the valve.

$i$ represents the pin that holds the end of the lever to its place.

$j$ represents the pin in the center of the lever.

L, Fig. 2, represents the aperture in the dash.

$m\ m\ m\ m$ represent the holes or perforations in the dash and valve.

Figure 3:
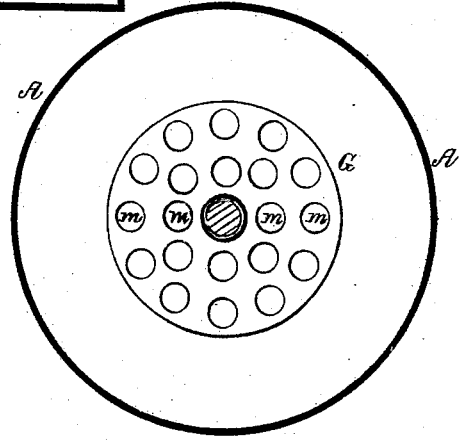

P, Fig. 3, represents the sleeve or hole in the center of the valve which is made to pass easily from $h$, Fig. 1, to the dash F.

What I claim as my invention and desire to secure by Letters Patent is—

The perforated valve dash to be worked with or without a lever substantially as set forth in the accompanying drawings and specification.

J. V. STEVENS.

Attest:
 H. BRAUCH,
 G. W. BRADSHAW.